Figure 1:
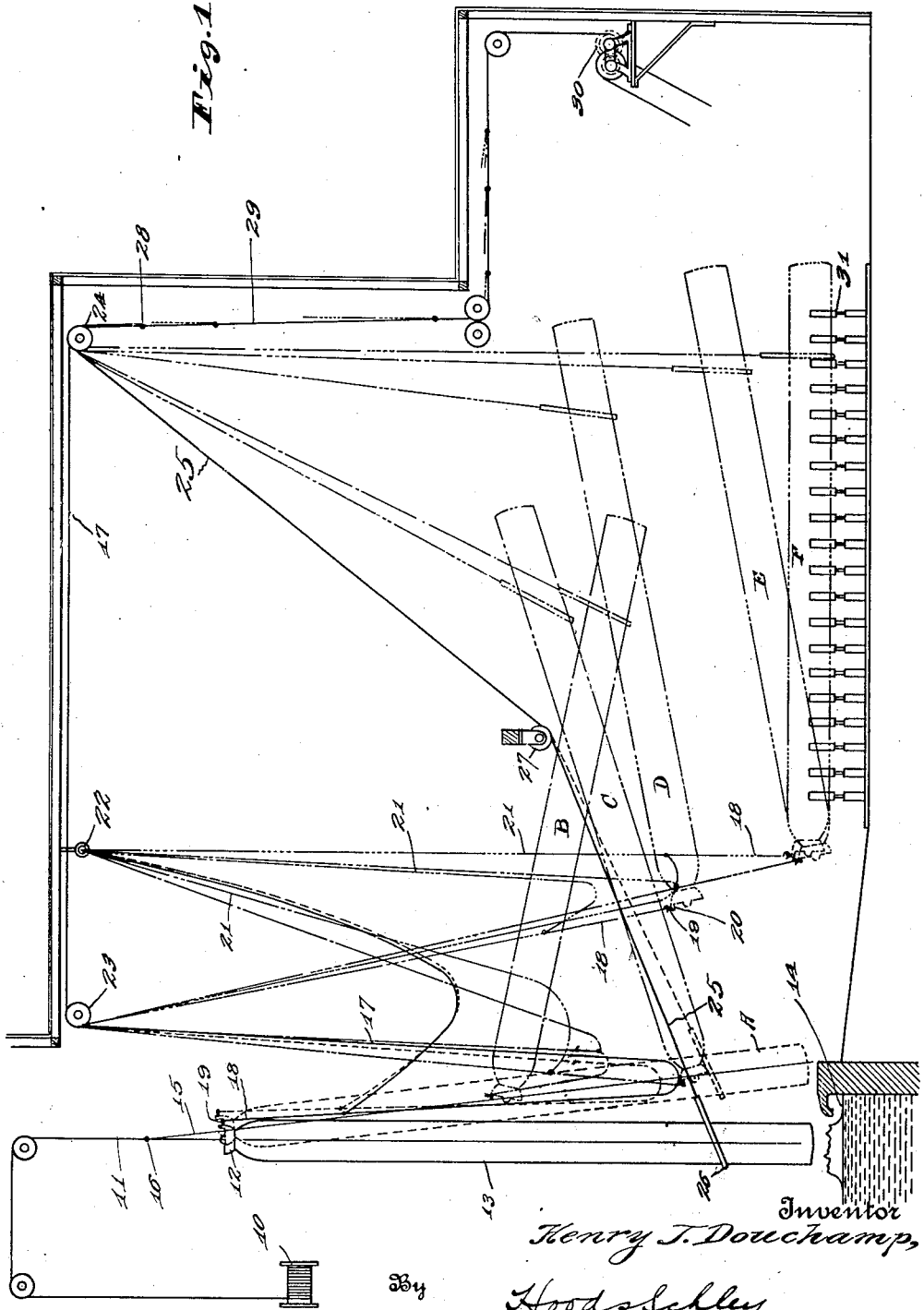

H. J. DOUCHAMP.
TAKEDOWN FOR MACHINE DRAWN CYLINDERS.
APPLICATION FILED DEC. 5, 1919.

1,359,236.

Patented Nov. 16, 1920.
2 SHEETS—SHEET 1.

Inventor
Henry J. Douchamp,
By Hood&Schley
Attorneys

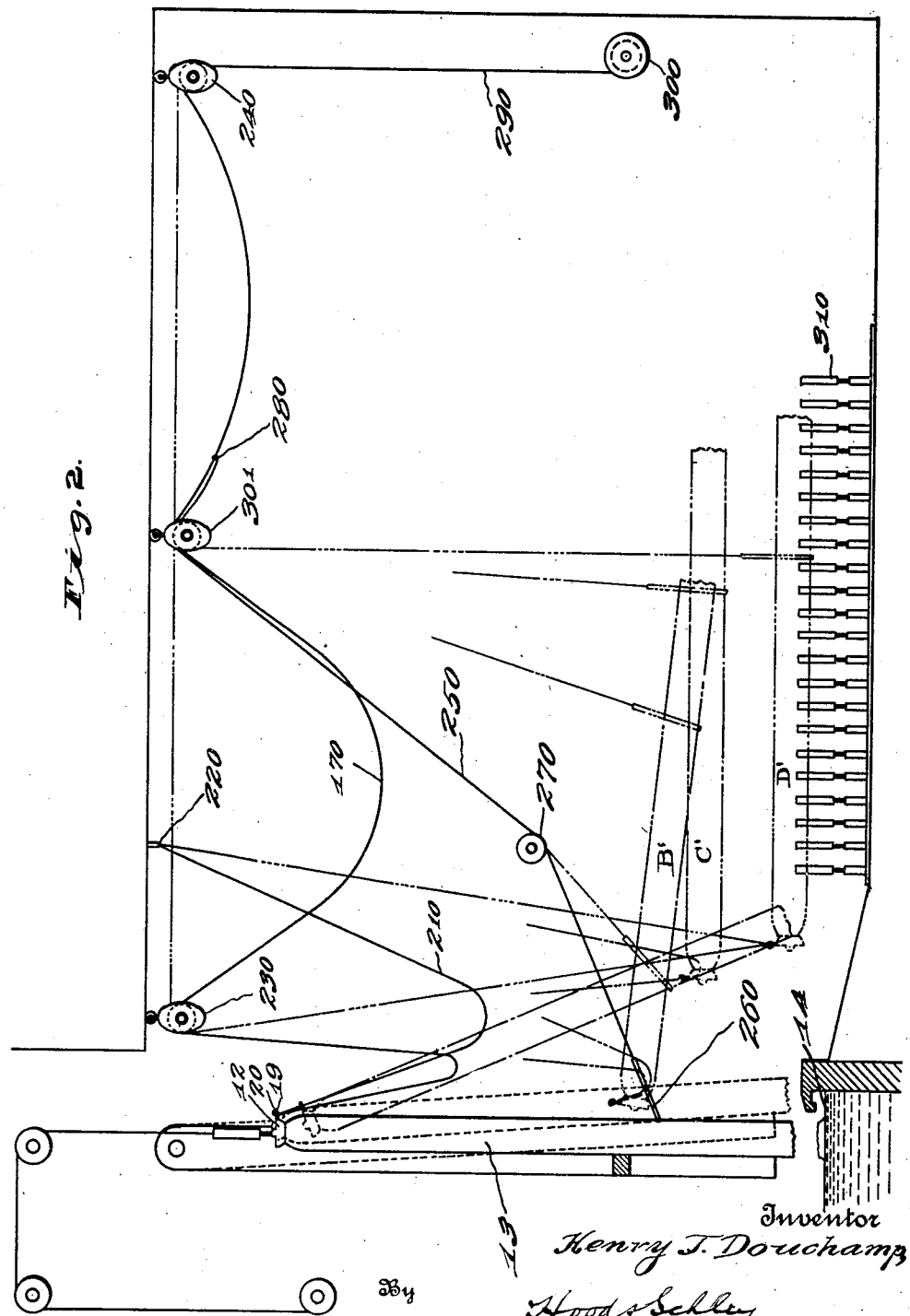

UNITED STATES PATENT OFFICE.

HENRY J. DOUCHAMP, OF SMETHPORT, PENNSYLVANIA, ASSIGNOR TO SMETHPORT GLASS COMPANY, OF SMETHPORT, PENNSYLVANIA, A CORPORATION OF PENNSYLVANIA.

TAKEDOWN FOR MACHINE-DRAWN CYLINDERS.

1,359,236.

Specification of Letters Patent.  Patented Nov. 16, 1920.

Application filed December 5, 1919.  Serial No. 342,606.

*To all whom it may concern:*

Be it known that I, HENRY J. DOUCHAMP, a citizen of the United States, residing at Smethport, in the county of McKean and State of Pennsylvania, have invented new and useful Takedowns for Machine-Drawn Cylinders, of which the following is a specification.

The object of my invention is to produce a simple yet efficient mechanism, capable of coöperation with the hoisting mechanism of a glass drawing apparatus in its descending movement, in such manner that a freshly drawn cylinder of glass may be lowered from vertical to horizontal position and deposited upon suitable supports.

The accompanying drawings illustrate diagrammatically my invention as applied to a glass drawing mechanism which involves cage guides which may be swung outwardly at their lower ends during the take-down operation. It is to be understood, however, that the take-down apparatus, with such slight modifications as would be immediately apparent to those skilled in the art, may be used in conjunction with any mechanism by means of which the bait end of the cylinder will be supported and lowered during the take-down operation, and that outward swinging of the lower ends of the cage guides is by no means essential.

The accompanying drawings illustrate my invention, Figure 1 being a diagrammatic illustration of one arrangement of the take-down cables and Fig. 2 a diagrammatic illustration of another arrangement of take-down cables.

In the drawings, 10 indicates a raising and lowering device of an ordinary type now commonly in use in the machine drawing of window glass, said device 10 controlling the upward and downward movement of a cable 11 which is attached to a bait 12, generally through the medium of a bait carriage (not shown) and by means of which the bait may be raised during the formation of the cylinder 13 from a bath 14 of molten glass, and lowered during the take-down operation.

In this arrangement of the apparatus I have indicated by the line 15, pivoted at 16, a runway, or guide, for the bait-hoisting device, which is capable of being swung outwardly at its lower end to facilitate the take-down operation, but this swinging guide 15 is not essential.

My take-down apparatus, for coöperation with the lowering operation of the bait, comprises a cable 17 which, for convenience of description, may be considered as having a supplemental end portion 18 which is provided with a suitable hook 19, adapted to be hooked into an eye 20 carried by bait 12. Coöperating with extension 18, is a fixed-length cable 21, which is suspended at 22 preferably substantially directly above the position which is to be occupied by the bait 12 when it has been delivered to its horizontal position. The length of the supplemental portion 18 may be varied to a considerable extent and, in fact, may be practically eliminated and cables 17 and 18 both carried to hook 19. Cable 17 is carried over a roller, or support, 23, located at an elevated point fairly close to the line of elevation of the bait, and is then carried back over a roller 24 which is located at an elevated point, at a point above the hole end of the cylinder 13 when said cylinder is in its desired horizontal position. Passing over the same (or a similar) pulley 24, is a cable 25 which is provided at its lower end with a hoop 26, of ordinary form, which is capable of engaging the lower end of the cylinder 13. Cable 25, beyond support 24, must be of sufficient length to engage the lower end of the cylinder 13 when the cylinder is in its vertical position, and cable 17 beyond support 24, must be of sufficient length to at least reach to bait 12 (or the upper end of extension 18) when the cylinder 13 is in its horizontal position. In practice, I have found that cable 17 is long enough to have a little slack in it when the cylinder reaches its lowest position, as shown in the drawing.

In order to prevent any upward slipping of the hoop 26 during the early outward movement of the hole end of the cylinder during the take-down operation, I have found it advisable to provide a roller, or other support, 27 arranged to deflect cable 25 for a portion of the time, as illustrated in the drawing. Both cables 17 and 25 may be carried to suitable winding drums, or other means for taking up their slack, or rather varying their lengths during the take-down operation, but I have found it convenient to attach these two cables, at a point 28 beyond support 24, to a single operation cable 29 which is passed to a suitable winding drum 30 of an ordinary character and capable of alternately winding and unwinding said cable 29.

The operation is as follows: Preferably at a time when the bait has risen to a convenient height, during the drawing operation, hook 19 is hooked into eye 20 of the bait, and cable 29 is slacked away until, when the cylinder has been completed, hoop 26 may be passed around its hole end, as shown in the drawings. At this time there will be, of course, considerable slack, in the cables 17 and 21, and the extension 18. The frame 15, if it is used, may then be swung outwardly to the position indicated by the dotted line A, and the cable 29 wound up sufficiently to keep the cable 25 taut, or the application of hoop 26 may be delayed until this time.

Thereupon, cable 29 will be wound up so as to simultaneously shorten cables 25 and 17 until the cylinder reaches the position indicated by the dotted lines C, passing through the intermediate position B, the bait 12 being lowered by the device 10 during the same time. By the time cylinder 13 reaches the position C, the relation between the bait 12 and the lowering mechanism will become such that the cylinder will swing automatically outwardly approximately to the position D, the bait separating from its hoisting mechanism. Thereupon, the operator permits cable 29 to unwind from the device 30 so that the cylinder will lower and swing outwardly to the position E, at which time the bait 12 will be substantially beneath support 22 and cable 21, as supplemented by the extension 18, will, for the first time, be stretched taut. Thereupon, further lowering of the cylinder brings it to the position F upon the horse 31.

The cylinder may now be capped and the bait will be supported by cable 21. It will, of course, be understood that cable 21 may be dispensed with and the lowering of the cylinder be accomplished by means of cables 17 and 25, but, in that case, it is likely to become necessary to shove the cylinder endwise in order to get it on the horse, and no satisfactory support for the bait and the attached cap is provided.

Support 23 should, of course, be in such position as to readily take the weight of the bait end of the cylinder and, as it is desirable that the bait end of the cylinder, when in horizontal position, be a considerable distance from the drawing plane, the cable 21, with its support 22 at a considerable distance from the drawing plane, is provided in order that the weight of the bait end of the cylinder may be automatically transferred from support 23 to support 22 as the cylinder is being lowered, so that the cylinder is thus automatically shifted endwise into coöperative relation with the horse.

In the arrangement shown in Fig. 2, cable 290 passes from the motor or winding drum 300 over the support 240 and is attached at 280 to a cable 170 and a cable 250, these two cables 170 and 250 passing over a support 301 which is suspended above the line of supports 310 at a suitable point between the ends of said supports. The cable 170 is passed over a support 230 which is arranged in the same position as the support 23 in the other form. Cable 170 is provided at its free end with a hook like the hook 19 which may be hooked into the eye 20 of bait 12 as in the other arrangement, a sufficient amount of slack being provided as in the other form. The cable 250 is provided at its free end with the cylinder engaging hoop 260 and cable 250 is of such form that the hook may be readily placed around the hole end of the cylinder, as indicated, a guide wheel 270 being provided as in the other form. Arranged substantially directly above the cap end of the support or horse 310 is a support 220 from which is suspended a cable 210 which is attached at its free end to the hook 19. The cable 210 is of fixed length, just sufficient to support the finished cylinder 13 upon or slightly above the horse 310. The operation of this arrangement is substantially the same as that of the arrangement shown in Fig. 1. Cables 250 and 170 are so proportioned in length that as cable 290 is wound up upon drum 300 during the initial portion of the take-down operation, the lower end of the cylinder 13 will be drawn outwardly by cable 250, while cable 170 is slack until just after the cylinder reaches the position B'. The position B' is reached just before the bait 12 has been lowered to a point where it is ready to detach itself from the hoisting cage and at the time this detachment takes place, the slack in cable 170 has been fully taken up by the winding up of cable 290 so that the cylinder is supported at the cap end by the cable 170 and at the hole end by the cable 250, the cylinder swinging automatically to the position C' as the bait detaches itself from the hoisting apparatus. As soon as the cylinder has assumed the position approximating that indicated at C', drum 300 is reversed in its movement and cable 290 paid out. This serves to pay out cables 250 and 170 and the cylinder moves downwardly substantially parallel to the floor until the position D' has been reached, the cylinder at this time being slightly above, but free from, the supports 310. At this time enough of cable 170 has been paid out so that the portion depending from support 230 is substantially equal to the length of cable 210. A further paying out of cable 290 serves to pay out cables 170 and 250, whereupon the weight of the bait end of the cylinder is transferred to cable 210 and enough of cable 250 is paid out to make the portion of this cable depending from support 301 effectively equal in length to cable 210, so that the cylinder swings automatically away from the drawing device and longitudinally of the support so as to come gently down to a position of rest upon the support.

It will be noted that the successive positions of the cylinder during the take-down operation differ slightly from the successive positions of the cylinder in the arrangement shown in Fig. 1, but that effectively the operations of the two arrangements are substantially identical, the difference being merely in proportions of the cable lengths.

It will be readily understood that these cable lengths may be modified and the positions of their supports be varied to a considerable extent so as to modify the movement of the cylinder during the take-down operation, but without departing from the elements of my invention.

I claim as my invention:

1. In a take-down device, the combination with means for lowering the bait end of a cylinder, of two cables, one supported at a point adjacent the lowering means, and the other supported at a point distant from the lowering means, the first-mentioned cable having means for attachment to the bait end of the cylinder, and the other having means for attachment to the hole end of the cylinder, a third cable supported at a point between the points of support of the first two mentioned cables and adapted to be attached to the bait end of the cylinder, and means by which the first two mentioned cables may be varied in length during the take-down operation.

2. A take-down apparatus for handling glass cylinders in transferring the same from a vertical to a horizontal position, comprising two cables, one of which is supported at a point above the highest point of the cylinder in its vertical position and adjacent the drawing means, and the other of which is supported at a point distant from the drawing means, the first-mentioned cable having means for attachment to the bait end of the cylinder and the last-mentioned cable having means for attachment to the hole end of the cylinder, a fixed-length cable supported at an elevated point between the points of support of the first-mentioned cables and adapted to be connected to the bait end of the cylinder, and means for varying the lengths of the first two mentioned cables during the take-down operation.

3. In a take-down device, the combination with means for lowering the bait end of a cylinder, of two variable-length cables, one supported at a point adjacent the lowering means and having means for attachment to the bait end of the cylinder, and the other supported at a point distant from the lowering means, and provided with means for attachment to the hole end of the cylinder, and a third, fixed-length, cable supported at an elevated point and between the vertical planes of the supports of the other two cables and adapted to be attached to the bait end of the cylinder.

In witness whereof, I have hereunto set my hand at Smethport, Pennsylvania, this 2nd day of December, A. D. one thousand nine hundred and nineteen.

HENRY J. DOUCHAMP.

Witness:
J. E. WALKER.